US006718713B2

(12) United States Patent
McKague, Jr. et al.

(10) Patent No.: US 6,718,713 B2
(45) Date of Patent: *Apr. 13, 2004

(54) APPARATUS AND METHOD FOR JOINING DISSIMILAR MATERIALS TO FORM A STRUCTURAL SUPPORT MEMBER

(75) Inventors: Elbert Lee McKague, Jr., Fort Worth, TX (US); Ronald P. Schmidt, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 198 days.

This patent is subject to a terminal disclaimer.

(21) Appl. No.: 10/025,393

(22) Filed: Dec. 19, 2001

(65) Prior Publication Data

US 2002/0053175 A1 May 9, 2002

Related U.S. Application Data

(63) Continuation-in-part of application No. 09/648,321, filed on Aug. 25, 2000, now Pat. No. 6,374,570.

(51) Int. Cl.⁷ .................................................. E04B 1/38
(52) U.S. Cl. .................... 52/309.13; 52/712; 52/729.2; 52/729.4
(58) Field of Search ............................ 52/712, 729.2, 52/729.4, 309.13

(56) References Cited

U.S. PATENT DOCUMENTS

| RE21,921 E | * 10/1941 | Greulich ................... 235/69 |
| 3,831,710 A | 8/1974 | Wirt |
| 4,177,306 A | 12/1979 | Schulz et al. |
| 4,331,495 A | 5/1982 | Lackman et al. |
| 4,734,146 A | 3/1988 | Halcomb et al. |
| 4,782,864 A | 11/1988 | Abildskov |
| 4,925,721 A | 5/1990 | Harper-Tervet et al. |
| 5,134,812 A | 8/1992 | Hoffman et al. |
| 5,308,675 A | 5/1994 | Crane et al. |
| 5,316,810 A | 5/1994 | Rogerson |
| 5,476,704 A | 12/1995 | Köhler |
| 5,795,094 A | 8/1998 | McKague, Jr. et al. |
| 5,974,760 A | * 11/1999 | Tingley .................... 52/729.1 |
| 6,374,570 B1 | * 4/2002 | McKague, Jr. ............. 52/762 |

FOREIGN PATENT DOCUMENTS

| FR | 2681003 | 3/1993 |
| JP | 62001524 | 1/1987 |

OTHER PUBLICATIONS

XP–001020746—*Development of a Trigger Mechanism to Reduce Peak Forces in Crash LoadedCcomposite Sine–Wave Spars* by W. Lestari, Delft University, Faculty of Aerospace Engineering, The Netherlands and J.F.M. Wiggenraad and H.G.S.J. Thuis, National Aerospace Laboratory NLR, the Netherlands.

* cited by examiner

*Primary Examiner*—Carl D. Friedman
*Assistant Examiner*—Steve Varner
(74) *Attorney, Agent, or Firm*—Bracewell Patterson, L.L.P.

(57) ABSTRACT

A preformed component or "preform" for a structural member has a planar base with two longitudinal legs extending in parallel from the base. A channel is defined between the legs for insertion of a flat plate that forms the first member of the structural member. The base of the preform is bonded to a composite panel. The preform is a composite material having continuous filaments of woven or braided fiber. The preform is impregnated with a thermoset resin that bonds the first member to the second member of the structural member. The preform may have filaments in the legs having a coefficient of expansion to match the plate, and filaments in the base having a coefficient of expansion to match the panel.

24 Claims, 4 Drawing Sheets

APPARATUS AND METHOD FOR JOINING DISSIMILAR MATERIALS TO FORM A STRUCTURAL SUPPORT MEMBER

CROSS-REFERENCE TO RELATED APPLICATIONS

This application is a continuation-in-part of application Ser. No. 09/648,321, filed Aug. 25, 2000.

BACKGROUND OF THE INVENTION

1. Technical Field

The present invention relates in general to an improved structural member, and in particular to an improved structural beam, made by joining dissimilar materials. Still more particularly, the present invention relates to a structural composite preform for joining the web of a structure with a second member formed from dissimilar materials.

2. Description of the Prior Art

Structures that require strength and a light weight may have dissimilar materials joined to each other. For example, an aircraft may have a composite panel or skin that is secured to an metal beam, such as of aluminum. Prior approaches to joining dissimilar materials such as metals and composites have generally relied on mechanical fastening if the two elements are at an angle. As shown in FIG. 1, a spar 1 having an inverted T-shaped metal plate 3 with a flange 5 is joined to a flat composite panel 7 with mechanical fasteners 9 such that metal plate 3 and composite panel 7 are perpendicular to each other. In such an arrangement, metal plate 3 must have a flange 5 to enable fastening to composite panel 7. The necessity of having flange 5 on metal plate 3 adds considerable cost to its fabrication since flange 5 significantly increases the volume of metal that must be purchased and then machined away. In addition, mechanical fastening involves drilling and countersinking holes, installing fasteners and, in some cases, treating the fastener heads to achieve a desired surface smoothness. These steps are expensive and can contribute an additional 25% to 60% to the overall cost of the spar assembly. Thus, an improved apparatus and method for forming a structural support member by joining dissimilar materials at an angle is needed.

SUMMARY OF THE INVENTION

A preformed component or "preform" for joining a first member to a second member of dissimilar materials has a planar base with two longitudinal legs extending in parallel therefrom. A channel is defined between the legs of the preform, and the first member, such as a flat metal plate that forms the web of the structural support member, is inserted into the channel. The base of the preform is bonded to the second member, typically a composite panel.

The preform is a composite material having continuous filaments of woven or braided fiber. The preform is impregnated with a thermoset resin that joins and bonds the first and second members to each other. The preform provides excellent structural support even if the first and second members are formed from dissimilar materials such as metal and composite. The resin is structurally reinforced with oriented fibers in such a manner as to provide coupling strength between the joined members.

When a single filament is chosen for the preform, its properties are selected to minimize the difference in thermal expansion coefficients of the metal web and the composite flange. However, the preform may have two or more types of filaments with different properties. The filament in the base of the preform is chosen such that its axial thermal expansion coefficient matches that of the composite flange. The filament in the legs of the preform is chosen such that its axial thermal expansion coefficient matches that of the metal web. These filaments are used in combination to provide coupling strength between the joined metal web and composite flange by having the best structural fiber oriented parallel to the legs of the preform, and by its being interwoven into the base of the preform.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
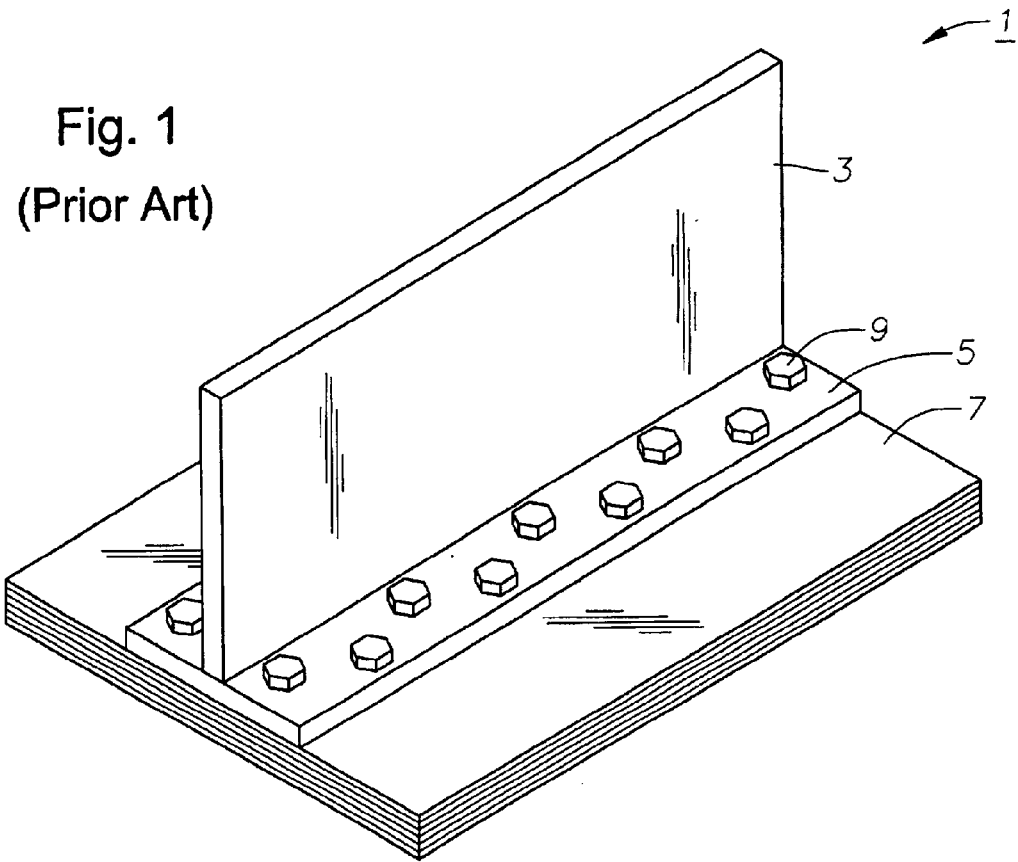
FIG. 1 is an isometric view of a conventional, prior art spar formed from dissimilar materials.
Figure 2:
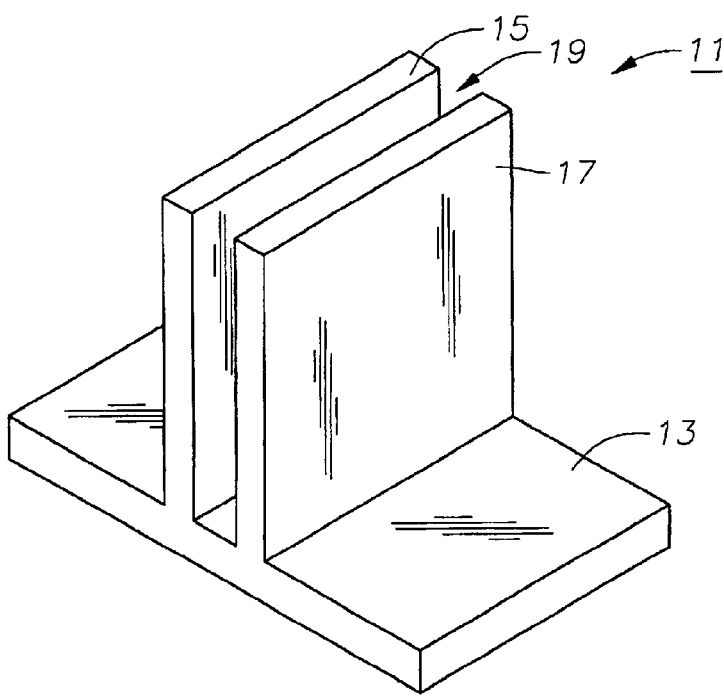
FIG. 2 is an isometric view of a structural preform constructed in accordance with the invention.
Figure 3:
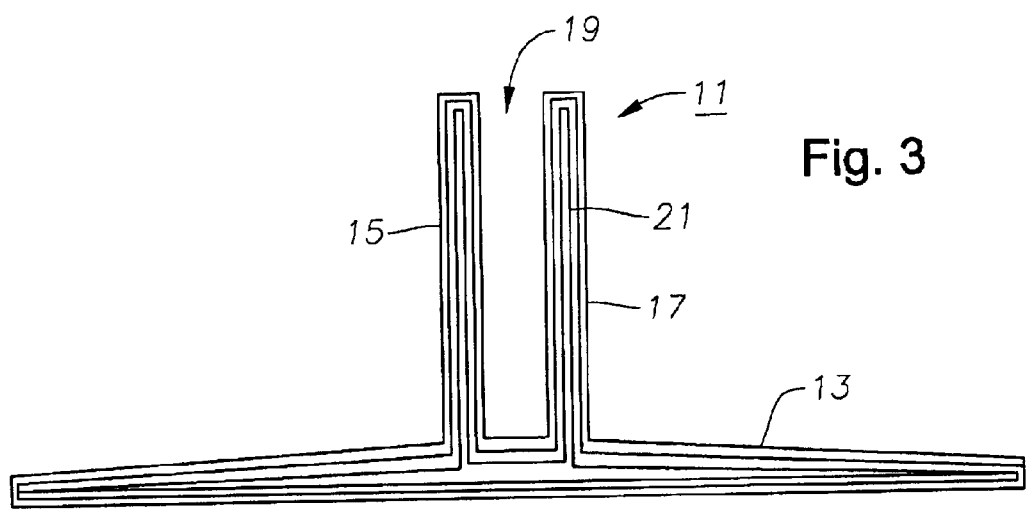
FIG. 3 is a sectional end view of the structural preform of FIG. 2.

Referring to FIGS. 2 and 3, a preformed component or "preform" 11 for a structural support beam is shown. When viewed from the end or in cross-section, preform 11 resembles the Greek letter π or "pi" having a longitudinal crossbar or base 13 with two longitudinal legs 15, 17 extending therefrom. A groove or channel 19 is defined between legs 15, 17. Preform 11 is a composite material that is formed by weaving or braiding continuous bundles or tows of structural fibers 21 (FIG. 2). The tows of fibers 21 are oriented to extend continuously throughout each segment of preform 11 including base 13 and legs 15, 17. The fiber preforms may be formed to provide any desired fiber architecture needed to impart chosen load-carrying capability and to accommodate any desired web plate thickness. Preform 11 may be impregnated with a suitable thermoset resin that acts as an adhesive to bond together two dissimilar materials. The resin is structurally reinforced with the filaments and/or fibers oriented in x, y, and z directions in such a manner as to provide coupling strength between the joined members.

Alternatively, preform 11 may be unimpregnated so that resin may be infused at a later step of the overall manufacturing process. In the latter embodiment, preform 11 is constructed by weaving or braiding the filaments in such a way that the process is not inhibited. After curing, preform 11 may be machined as needed by an appropriate method to provide desired edge straightness, smoothness, and dimensional control.

Figure 4:
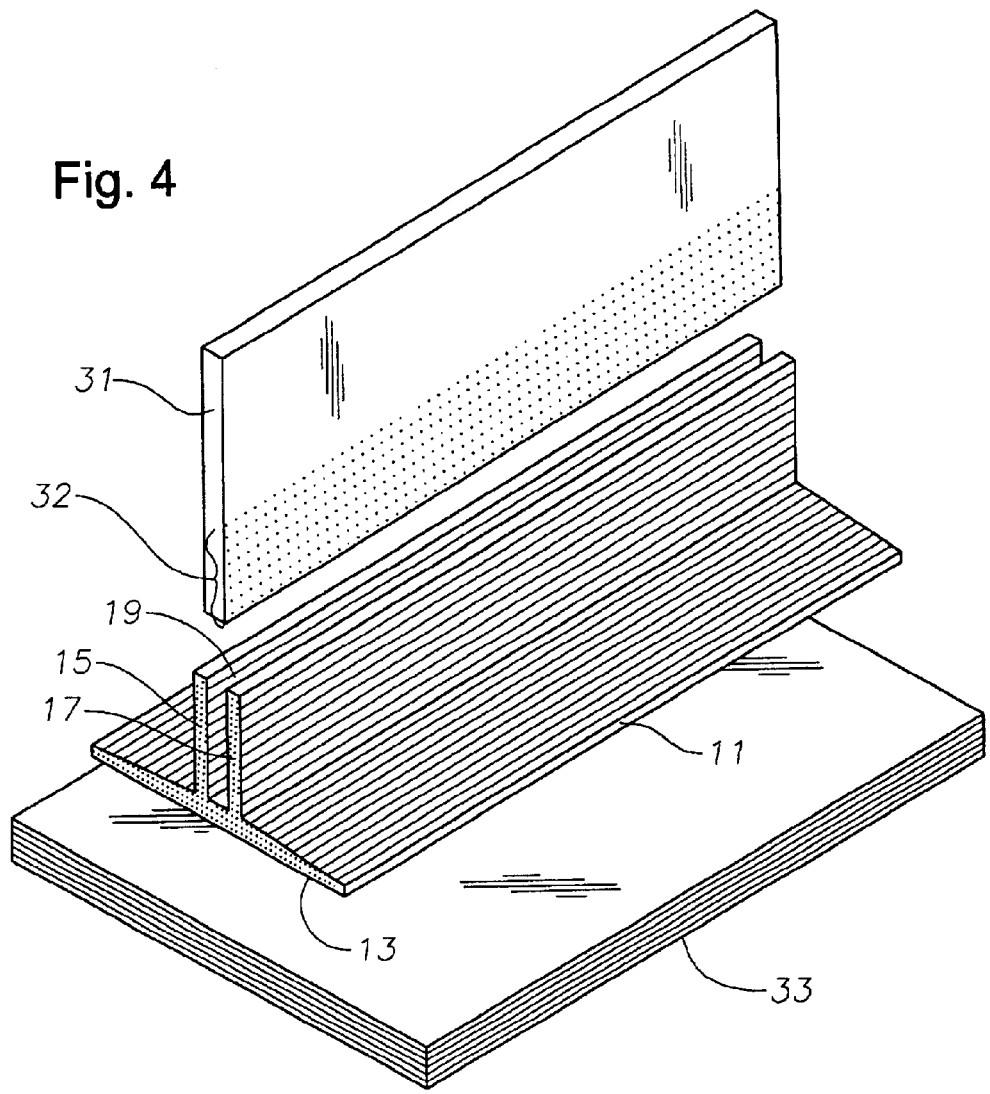
FIG. 4 is an exploded, isometric view of the structural preform of FIG. 2, a composite panel, and a metallic plate.
Figure 8:
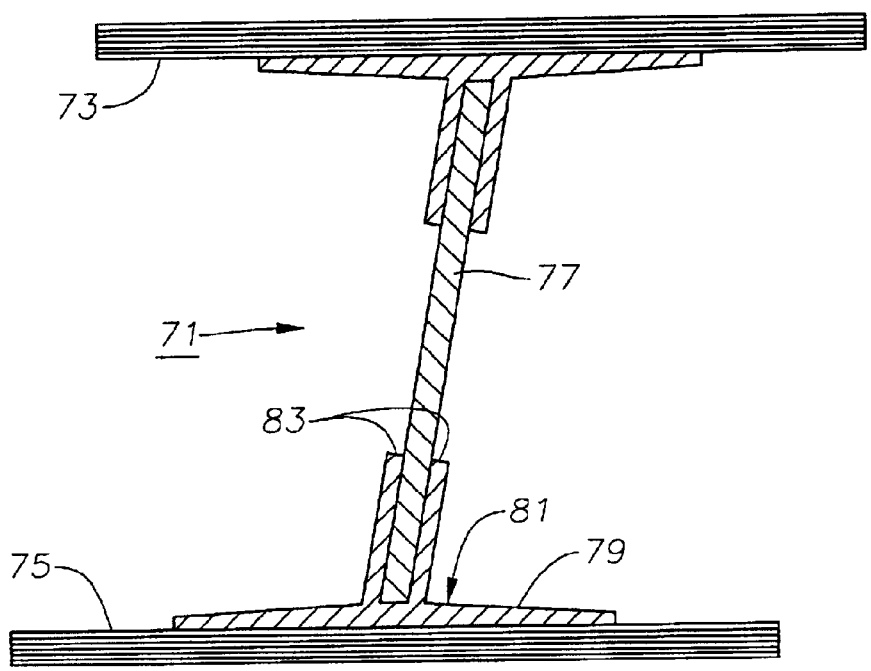
FIG. 8 is an end view of an alternate embodiment of a beam constructed in accordance with the invention.

Referring now to FIG. 4, preform 11 is used to join a first member, such as a flat metallic beam or plate 31 to a flat composite panel 33, such as an aircraft skin, at an angle. Metallic plate 31 has a zone 32 that is prepared for bonding to preform 11. Preparation may be any suitable, established method appropriate to the selected metal alloy, such as chemical etching. Composite panel 33 may also be prepared in the zone to be mated with the preform by a suitable method such as removal of a peel ply. In the embodiment shown, metallic plate 31 forms the web of a structural support member for composite panel 33, and the angle between plate 31 and panel 33 is perpendicular. However, plate 31 may be a composite and panel 33 metallic. Members 31, 33 can be joined at other angles relative to each other because the fibrous preform 11 is flexible prior to curing the resin. In FIG. 8, a structural member 71 has a metallic plate 77 secured at a non-orthogonal angle between upper and lower panels 73, 75. The bases 79 of the preforms 81 are substantially flat and parallel relative to panels 73, 75, while the legs 83 of preforms 81 are inclined at the non-orthogonal angle relative to bases 79.

Figure 5:
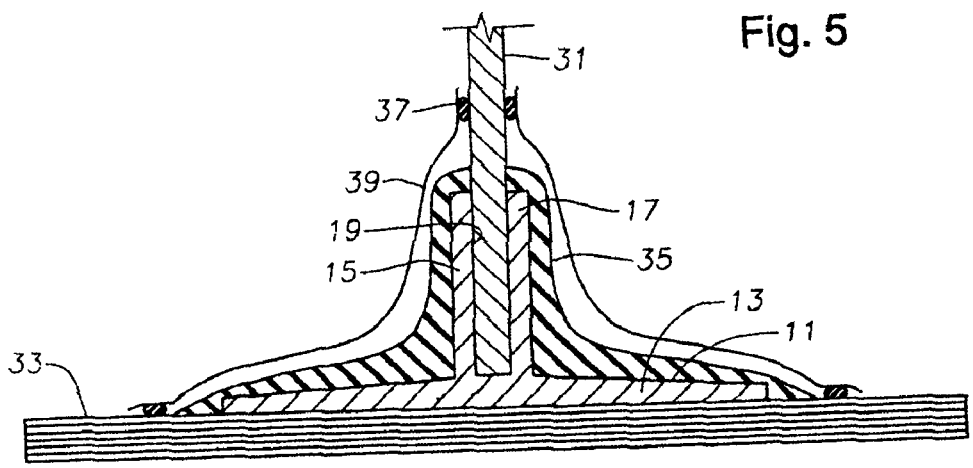
FIG. 5 is a schematic end view of the preform, panel, and web of FIG. 4 during fabrication.

During assembly, one of the longitudinal edges of metallic plate 31 is fully inserted into channel 19 of preform 11 until it bottoms out as shown in FIG. 5 or is appropriately close to bottoming out. The two legs 15, 17 closely receive and straddle the thickness of plate 31. The vertical sides or edges of plate 31 are not attached to preform 11. Next, base 13 of preform 11 is positioned against a composite panel 33. Composite panel 33 may be either cured or uncured, but in the preferred embodiment of the invention, it is already cured to provide the desired configuration and dimensional tolerances in order to simplify the assembly tooling that is required.

The fastenerless assembly of the metallic and composite elements 31, 33 also may be accomplished via the following steps. The base 13 of the uncured, resin-impregnated preform 11 is placed at the desired joining location onto the base plate or plate (usually composite panel 33) after it has been suitably cleaned or prepared for bonding. Using appropriate fixtures, the metallic plate 31 is placed in channel 19 of uncured preform 11 at the desired angle relative to composite panel 33. Appropriate boundary tooling, such as conventional molded shapes of silicone rubber or other suitable pressure intensifier/transmitter 35 (FIG. 5), is positioned against each side of preform 11. Vacuum bagging materials 39 are placed around the resulting assembly, sealed with sealant beads 37, and a vacuum is pulled under the bag.

If the preform was previously unimpregnated, a selected resin is infused therein. The total structure is heated according to a thermal profile suitable for curing the thermosetting resin that impregnates preform 11, thereby creating structural bonds that integrally link preform 11 to metallic plate 31 to create a desired structure. If desired or required, autoclave pressure can be simultaneously applied to provide compaction of preform 11 during cure of the resin. The resin and the maximum cure temperatures are selected to provide a cured glass transition temperature greater than the intended use temperature of the assembly. Alternatively, a resin can be used which has a suitable chemistry, such as free-radical polymerization, so that an energetic beam of electrons can initiate and complete the cure (a process known in the industry as electron beam curing). Following completion of the required cure cycle, the bagging materials and positioning fixtures are removed, yielding a completed assembly.

Figure 7:
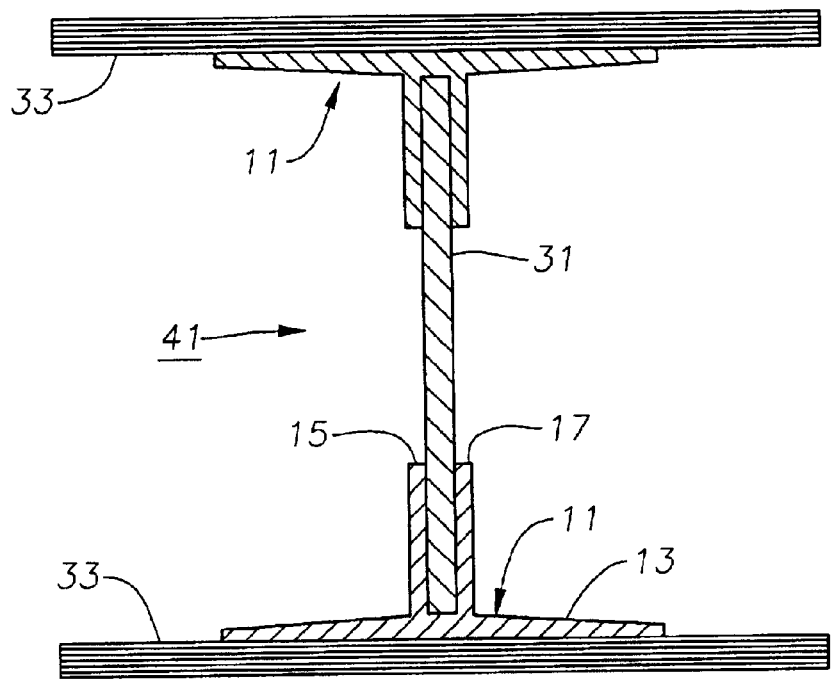
FIG. 7 is an end view of a beam constructed from the components of FIG. 4 in accordance with the invention.

Alternatively, it should be readily apparent to one skilled in the art that all of the curable materials may be uncured at the time of assembly of metallic plate 31, preforms 11, and composite panel 33. After the respective components are assembled and placed in suitable tooling, the resin in preform 11 can be injected in a resin transfer molding type of process, or infused by placing a thick layer of resin over the preform and applying a vacuum bag. Although this reduces the number of cure cycles required, it significantly complicates the assembly cure tooling requirements, thereby increasing both cost and risk. By still another means, a co-bonding of preform 11 with an uncured composite panel 33 can be accomplished. Although the process was described for only one longitudinal edge of plate 31, this series of steps may be performed simultaneously on both longitudinal edges of plate 31 to form the end product shown in FIGS. 7 and 8.

Depending upon the actual use temperature of the assembly and the chemistry of the selected resin, it may be necessary to expose the assembly to resin cure temperatures as high as 350 degrees F. At such temperatures, the dimensional growth of each plate or plate 31, 33 is governed by its respective thermal expansion coefficient. An aluminum plate 31, having an expansion coefficient of approximately 12 micro-inch/inch/degree F., will expand by about 3300 micro-inch/inch of length. In contrast, a composite panel 33 formed from carbon fiber impregnated with epoxy resin has negligible expansion. This difference in expansion imparts a significant strain on the joined plate and plate 31, 33, thereby degrading the mechanical performance of the assembly and making it difficult to achieve the desired dimensional control of the assembly because of bowing induced by the thermal mismatch. In the legs 15, 17 of preform 11, an axial fiber having a thermal expansion coefficient much closer to that of aluminum plate 31 reduces the amount of strain built into the assembly by the curing operation.

Figure 6:
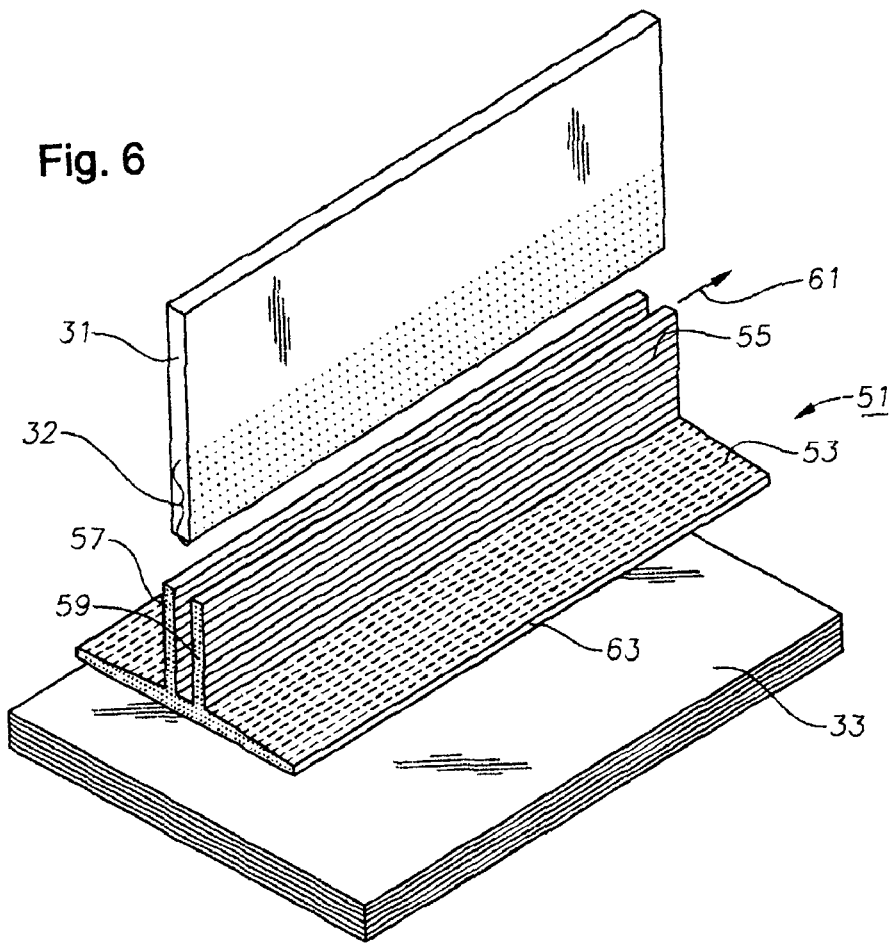
FIG. 6 is an exploded, isometric view of an alternate version of the structure of FIG. 4.

In FIG. 6, an alternate embodiment depicts a preform 51 having two (or more) types of filaments and/or fibers having different properties. Base filament 53, which is oriented parallel to the length of preform 51, is chosen such that its axial thermal expansion coefficient matches that of composite panel 33 as closely as possible. Leg filament 55, which also is oriented parallel to the length of preform 51, is chosen such that its axial thermal expansion coefficient matches that of metallic plate 31 having bonding zone 32 as closely as possible. Filaments 53, 55 are used in combination to provide coupling strength to the joined metallic plate 31 and composite panel 33 by being oriented parallel to the legs 57, 59 of preform 51 (in the direction of arrow 61), and by being interwoven into the base 63 of preform 51. The fiber or filament 53 chosen to provide coupling strength is oriented orthogonal to the fiber and/or filaments 55 chosen for thermal expansion characteristics. These orthogonal fibers 53 traverse the width of preform 51, following its shape back and forth in a manner resulting from weaving of woof fibers, i.e., those fibers which are perpendicular to the lengthwise direction of the preform.

The extent and pattern, if any, for blending the two axial fibers 53, 55 in the area where the legs 57, 59 intersect base 63 are determined on an application-specific basis through analysis and/or empirical methods. When a single filament is chosen for preform 51 (FIG. 4), its properties are selected in order to minimize its difference in thermal expansion coefficients with metallic plate 31 and composite panel 33. However, in all cases the filaments are oriented parallel to the axis and continuous length of the preform.

An example of filament or fiber selections would be E-glass® or S-glass® fibers for the axial direction of preform 51, and high strength carbon fibers such as Hexcel AS4® or Toray T300® for the coupling strength direction parallel to the vertical direction of legs 55, 57). Glass fibers provide a thermal expansion coefficient on the order of 6 micro-inch/inch/degree F., whereas carbon fibers have an expansion coefficient near zero. Thus, glass fibers are a better thermal strain match with aluminum than with carbon fiber. Alternatively, metallic filaments in the axial direction impart a smaller difference in thermal strains between the legs 55, 57 of preform 51 and metallic plate 31. High modulus carbon fibers such as Hexcel IM7® or Amoco T600M® may be used for the coupling strength direction, where the total distance over which strain differences are multiplied is very small.

During the cure of the resin, temperature is controlled so that the resin gels at as low a temperature as is practical. This step is followed by a slow rise in temperature to levels necessary to achieve the required glass transition temperature of the cured resin. Gelling the resin at a lower temperature aids the establishment of a stress-free temperature point that is lower than that required to achieve the needed glass transition temperature. The rise in temperature after gellation must be very slow so that resin cross-link density is increased at such a rate that increasing levels of thermally-induced strain does not break down the tender bond. After completing the maximum temperature dwell, cool down preferably occurs at as slow a rate as practical until a temperature is reached that is at least 50 degrees F. lower than the gellation temperature. This slow cool down allows some relaxation to occur in the polymer and helps to preserve the lowest possible stress-free temperature. The difference in stress-free temperature and ambient temperature, multiplied by the difference between thermal expansion coefficient of metallic plate 31 and that of the axial fibers in preform 51, determine the amount of thermally-induced strain in the resulting assembly.

The present invention has several advantages. Woven or braided pi-shaped preforms join metallic plates and composite panels at angles relative to each other without the use of mechanical fasteners. The preforms provide much greater strength than conventional adhesive bonding techniques while simplifying and reducing the cost of manufacturing. The present invention does not require drilling, countersinking, fastener installation, or fastener head treatments. Whereas mechanical fastening involves incremental work progressing along the joint length, the present invention treats the entire joint in one step. This enables a very large reduction of 20% to 55% in the total cost of the assembly. In addition, the present invention is also lighter in weight than prior art solutions because the resin-impregnated preform weighs less than the number of fasteners that would be required to provide an equivalent strength joint. Moreover, the metallic member can be a flat plate or plate without a flange, thereby significantly reducing the cost of fabricating the metal detail for many complex, high performance structures such as those used for aircraft.

While the invention has been shown or described in only some of its forms, it should be apparent to those skilled in the art that it is not so limited, but is susceptible to various changes without departing from the scope of the invention.

What is claimed is:
1. A structural member, comprising:
a first member formed from one of a metallic material and a composite material, the first member having a longitudinal edge extending in an axial direction;
a second member formed from the other of the metallic and composite materials;
a preform formed from composite materials and having a base with a pair of axially elongated legs extending therefrom to define a channel therebetween, wherein the preform is formed from filaments that extend through the base and legs; and wherein
the longitudinal edge of the first member is bonded in the channel of the preform and the second member is bonded to a surface of the base of the preform.

2. The structural member of claim 1 wherein the filaments of the preform include axially oriented filaments that are selected to minimize a difference in thermal expansion coefficients of the first member and the second member.

3. The structural member of claim 1 wherein the preform has a pi-shaped cross-section.

4. The structural member of claim 1 wherein the filaments of the preform include axial filaments that are oriented parallel to an axial, continuous length of the preform.

5. The structural member of claim 1 wherein the filaments of the preform include axial filaments that are oriented parallel to an axial, continuous length of the preform and orthogonal filaments that are perpendicular to the axial filaments.

6. The structural member of claim 1 wherein the second member and the base of the preform are inclined at a non-orthogonal angle relative to the first member.

7. The structural member of claim 1 wherein the preform is impregnated with a thermoset resin that acts as an adhesive to bond together the first member and the second member.

8. The structural member of claim 1 wherein the filaments of the preform comprise a first type of axial filament in the base, and a second type of axial filament in the legs.

9. The structural member of claim 8 wherein the first and second types of axial filaments are blended in an area where the legs intersect the base.

10. The structural member of claim 8 wherein the first type of axial filament has a thermal expansion coefficient that substantially matches a thermal expansion coefficient of the second member, and wherein the second type of axial filament has a thermal expansion coefficient that substantially matches a thermal expansion coefficient of the first member.

11. A structural member, comprising:
a first member formed from one of a metallic material and a composite material, the first member having a longitudinal edge extending in an axial direction;
a second member formed from the other of the metallic and composite materials;
a generally pi-shaped preform formed from composite materials and having a base with a pair of axially elongated legs extending therefrom to define a channel therebetween, the preform being formed from axial filaments that extend through the base and legs, wherein the axial filaments are oriented parallel to the axial direction and a continuous length of the preform, and the axial filaments are selected to minimize a difference in thermal expansion coefficients of the first member and the second member; and wherein
one of the longitudinal edges of the first member is bonded in the channel of the preform and the second member is bonded to a surface of the base of the preform.

12. The structural member of claim 11 wherein the second member and the base of the preform are inclined at a non-orthogonal angle relative to the first member.

13. The structural member of claim 11 wherein the preform is impregnated with a thermoset resin that acts as an adhesive to bond together the first member and the second member.

14. The structural member of claim 11 further comprising orthogonal filaments extending through the legs and base perpendicular to the axial filaments.

15. The structural member of claim 11 wherein the preform has a first type of axial filament in the base, and a second type of axial filament in the legs, and wherein the first and second types of axial filaments are blended in an area where the legs intersect the base.

16. The structural member of claim 15 wherein the first type of axial filament has a axial expansion coefficient that substantially matches a thermal expansion coefficient of the second member, and the second type of axial filament has a thermal expansion coefficient that substantially matches a thermal expansion coefficient of the first member.

17. A method for fabricating a structural member, comprising the steps of:
(a) providing a first member formed from one of a metallic material and a composite material and having a longitudinal edge extending in an axial direction, and a second member formed from the other of the metallic and composite materials;
(b) forming a preform from composite materials, the preform having a base with a pair of legs extending therefrom to define a channel therebetween, wherein the preform has filaments that extend through the base and the legs;
(c) positioning boundary tooling on the preform, first member, and second member and heating the structural member;
(d) bonding the longitudinal edge of the first member in the channel of the preform such that the legs of the preform closely receive the first member; and
(e) bonding the base of the preform to the second member to form a structural member.

18. The method of claim 17 wherein steps (d) and (e) comprises heating the first member, second member, and preform to create structural bonds therebetween.

19. The method of claim 17, further comprising the step of impregnating the preform with a thermoset resin.

20. The method of claim 17 wherein the preform of step (b) is unimpregnated, and further comprising the step of infusing or injecting the unimpregnated preform with resin.

21. The method of claim 17, further comprising the step of applying autoclave pressure to the preform to provide compaction of the preform.

22. The method of claim 17, further comprising the step of curing said one of the first member and the second member formed from the composite material.

23. The method of claim 17 wherein step (c) comprises placing a sealed pressure intensifier over the preform inside a vacuum bag.

24. The method of claim 17, further comprising the step of inclining the first member of the preform at a non-orthogonal angle relative to the second member and the base of the preform.

* * * * *